(12) United States Patent
Korhummel (10) Patent No.: US 10,211,521 B1
(45) Date of Patent: Feb. 19, 2019

(54) MILLIMETER WAVE SENSOR SYSTEM (71) Applicant: Verily Life Sciences LLC, Mountain View, CA (US)

(72) Inventor: Sean Korhummel, Mountain View, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 0 days.

(21) Appl. No.: 15/604,761

(22) Filed: May 25, 2017

Related U.S. Application Data (60) Provisional application No. 62/351,232, filed on Jun. 16, 2016.

(51) Int. Cl.
| H01Q 1/27 | (2006.01) |
| H01Q 1/24 | (2006.01) |
| H04B 17/27 | (2015.01) |
| A42B 3/04 | (2006.01) |
| A63B 71/10 | (2006.01) |
| H04B 1/3827 | (2015.01) |

(52) U.S. Cl.
CPC .............. *H01Q 1/276* (2013.01); *A42B 3/046* (2013.01); *A63B 71/10* (2013.01); *H01Q 1/248* (2013.01); *H04B 17/27* (2015.01); *H04B 2001/3866* (2013.01)

(58) Field of Classification Search
CPC ......... H04B 17/27; H01Q 1/276; H01Q 1/248
USPC ....................................................... 455/66.1
See application file for complete search history.

(56) References Cited

U.S. PATENT DOCUMENTS

| 2008/0191950 A1* | 8/2008 | Chang .................... H01Q 1/276 343/718 |
| 2009/0066517 A1* | 3/2009 | Erikson ............ G06K 19/07749 340/572.7 |
| 2011/0112602 A1* | 5/2011 | Lee ..................... A61N 1/36082 607/45 |
| 2011/0133896 A1* | 6/2011 | Rossman .......... G06K 19/07756 340/10.1 |
| 2015/0115733 A1* | 4/2015 | Sealy ...................... H02J 50/10 307/104 |

* cited by examiner

Primary Examiner — Ayodeji O Ayotunde
(74) Attorney, Agent, or Firm — McDonnell Boehnen Hulbert & Berghoff LLP (57) ABSTRACT Systems and methods are described that relate to measuring relative positions of, or distance between, a helmet-mountable device and a head-mountable device. The helmet-mountable device includes a radio frequency (RF) source of a millimeter wave signal comprising millimeter wave radiation. The head-mountable device includes a plurality of rectenna devices. Each rectenna device of the plurality of rectenna devices converts millimeter wave radiation emitted by the RF source into a direct current (DC) electrical signal. The head-mountable device includes a memory and at least one processor. The at least one processor executes instructions stored in the memory so as to carry out operations, which include receiving, from each rectenna device of the plurality of rectenna devices, a respective DC electrical signal. The operations also include storing, in the memory, information indicative of the respective DC electrical signals.

20 Claims, 11 Drawing Sheets

|  | x=1 | x=2 | x=3 | x=4 | x=5 |
|---|---|---|---|---|---|
| y=1 | 0 | 1 | 1 | 1 | 0 |
| y=2 | 1 | 2 | 4 | 2 | 1 |
| y=3 | 1 | 4 | 10 | 4 | 1 |
| y=4 | 1 | 2 | 4 | 2 | 1 |
| y=5 | 0 | 1 | 1 | 1 | 0 |

Figure 6A

|     | x=1 | x=2 | x=3 | x=4 | x=5 |
|-----|-----|-----|-----|-----|-----|
| y=1 | 1   | 2   | 1   | 0   | 0   |
| y=2 | 2   | 4   | 2   | 1   | 0   |
| y=3 | 4   | 10  | 4   | 2   | 0   |
| y=4 | 2   | 4   | 2   | 1   | 0   |
| y=5 | 1   | 2   | 1   | 0   | 0   |

Figure 6B

|     | x=1 | x=2 | x=3 | x=4 | x=5 |
| --- | --- | --- | --- | --- | --- |
| y=1 | 1 | 2 | 4 | 2 | 1 |
| y=2 | 2 | 5 | 8 | 5 | 0 |
| y=3 | 4 | 8 | 20 | 8 | 4 |
| y=4 | 2 | 5 | 8 | 5 | 0 |
| y=5 | 1 | 2 | 4 | 2 | 1 |

Figure 6C

|     | x=1 | x=2 | x=3 | x=4 | x=5 |
|-----|-----|-----|-----|-----|-----|
| y=1 | 1   | 0   | 0   | 0   | 0   |
| y=2 | 2   | 1   | 0   | 0   | 0   |
| y=3 | 4   | 2   | 1   | 0   | 0   |
| y=4 | 8   | 5   | 2   | 1   | 0   |
| y=5 | 20  | 8   | 4   | 2   | 1   |

MILLIMETER WAVE SENSOR SYSTEM

CROSS-REFERENCE TO RELATED APPLICATIONS

The present application is a non-provisional patent application claiming priority to Provisional Patent Application No. 62/351,232, filed Jun. 16, 2016, the contents of which are hereby incorporated by reference.

BACKGROUND

Unless otherwise indicated herein, the materials described in this section are not prior art to the claims in this application and are not admitted to be prior art by inclusion in this section.

Helmets and other protective equipment help to reduce injury during athletic activities. For example, football helmets protect a wearer's face with a facemask and reduce head injuries by deflecting and absorbing the force of a blow to the wearer's head. However, repeated and/or severe blows to the head may lead to concussions and may increase the likelihood of developing conditions like chronic traumatic encephalopathy (CTE).

SUMMARY

In an aspect, a system is provided. The system includes a helmet-mountable device and a head-mountable device. The helmet-mountable device includes a radio frequency (RF) source of a millimeter wave signal that includes millimeter wave radiation. The head-mountable device includes a plurality of rectenna devices. Each rectenna device of the plurality of rectenna devices converts millimeter wave radiation emitted by the RF source into a direct current (DC) electrical signal. The helmet-mountable device also includes a memory and at least one processor. The at least one processor executes instructions stored in the memory so as to carry out operations. The operations include receiving, from each rectenna device of the plurality of rectenna devices, a respective DC electrical signal. The operations also include storing, in the memory, information indicative of the respective DC electrical signals.

In an aspect, a method is provided. The method includes causing a radio frequency (RF) source in a helmet-mountable device to emit a millimeter wave signal that includes millimeter wave radiation. The method also includes converting, by each rectenna device of a plurality of rectenna devices in a head-mountable device, at least a portion of the millimeter wave signal into a respective DC electrical signal. The method further includes determining, based on the respective DC electrical signals of the plurality of rectenna devices, a relative position between the RF source and the plurality of rectenna devices. The method yet further includes storing, in a memory, information indicative of the relative position.

In an aspect, a system is provided. The system includes a radio frequency (RF) source of a millimeter wave signal that includes millimeter wave radiation. The system also includes a plurality of rectenna devices. Each rectenna device of the plurality of rectenna devices converts millimeter wave radiation emitted by the RF source into a direct current (DC) electrical signal. The system also includes a memory and at least one processor. The at least one processor executes instructions stored in the memory so as to carry out operations. The operations include receiving, from each rectenna device of the plurality of rectenna devices, a respective DC electrical signal. The operations also include storing, in the memory, information indicative of the respective DC electrical signals and determining, based on the respective DC electrical signals, a relative position between the RF source and the plurality of rectenna devices. The system yet further includes storing, in a memory, information indicative of the relative position.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Further, while embodiments disclosed herein make reference to use on or in conjunction with a living human body, it is contemplated that the disclosed methods, systems and devices may be used in any environment where measuring and/or estimating a movement or location of a first body with respect to a second body is desirable. For example, one of skill in the art will recognize that the embodiments disclosed herein may be used to sense the direction and amplitude of impacts or other movements between other objects and/or bodies. Moreover, while the present disclosure describes embodiments for use as a patch on the skin, one of skill in the art will also recognize that embodiments that include implantable devices are possible as well.

Overview

Systems, devices, and methods described herein may relate to monitoring of various physiological conditions of a living body. In an example embodiment, such monitoring may include detection and quantification of impacts to a head using a helmet-mountable radio frequency (RF) source and a head-mountable rectenna array.

The RF source may be coupled to an inside of a helmet. The RF source may be operable to radiate RF power at a narrow-band millimeter wave frequency with a narrow beam. As such, the RF source may act as an RF signal transmitter.

The head-mountable device may include multiple single-element rectifying antennas, or rectennas. The rectennas may be configured to convert electromagnetic energy into direct current (DC) electricity. The rectennas may be arranged in a one-dimensional or two-dimensional array. In some embodiments, the head-mountable device may take the form of a small patch. The head-mountable device may be coupled to a helmet-wearer's head (e.g., forehead or other scalp location) via an adhesive coating on the patch. As such, the head-mountable device may act as an RF signal receiver.

In operation, one or more of the rectennas in the rectenna array may receive incident millimeter wave power emitted by the RF source. The power received by each individual rectenna is converted to a respective DC signal, which may be discretized to a digital value. The digital values may be used to map the relative location between the RF source and the rectenna array. For example, the rectenna with the maximum received power may be considered to be closest to the RF source. Changes over time in the relative location between the RF source and the rectenna array may correspond to impacts. A force vector of an impact may be calculated, for example, using of a real-time on-board algorithm or a lookup table of known calibration measurements. Additionally or alternatively, an off-line machine learning algorithm may be used to calculate the force vector.

By sampling the rectenna values and recording real-time power levels, a displacement delta vector of the head to the helmet may be determined based on the location and amplitude of received RF power.

Some examples of the present disclosure relate to systems and devices that are configured to be worn on a living body and that may be operable to obtain measurements related to physiological conditions of the body via sensors on the devices. Such devices, described herein as head-mountable devices, can be configured to be mounted to an external body surface of a wearer and to enable a variety of applications and functions. The term "head-mountable device," as used in this disclosure, refers to any device that is capable of being worn at, on or in proximity to a human head. In an example embodiment, the head-mountable device is configured as an adhesive patch. The term "helmet-mountable device," as used in this disclosure, refers to any device that is capable of being coupled to a helmet.

System Examples

Figure 1:
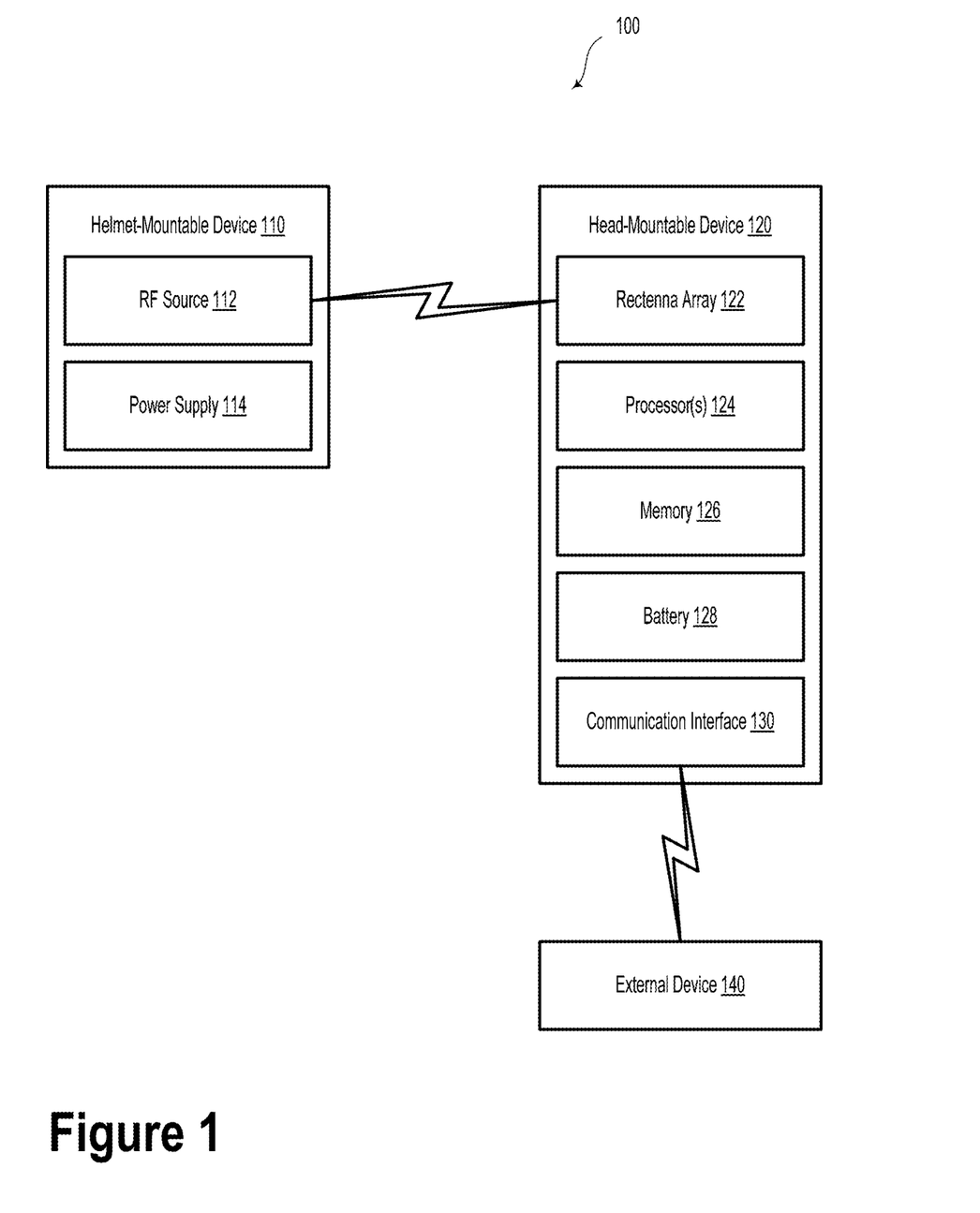
FIG. 1 is a block diagram of a system according to an example embodiment.

FIG. 1 is a block diagram of a system 100 according to an example embodiment.

System 100 includes a helmet-mountable device 110, a head-mountable device 120, and an optional external device 140. The helmet-mountable device 110 includes a radio frequency (RF) source 112 and a power supply 114. The helmet-mountable device 110 may be attached or otherwise coupled to a helmet, such as a football helmet.

The power supply 114 may include a battery, which may be rechargeable via wired or wireless means. In some embodiments, the power supply 114 may include a standard electrical connection (e.g., a corded wall plug).

The RF source 112 may include a solid state microstrip waveguide oscillator, a high-Q oscillator, a Colpitts oscillator, or a Gunn oscillator. In an example embodiment, a microstrip waveguide may be formed on a printed circuit board (PCB). In some embodiments, the RF source 112 may be fabricated using complementary metal-oxide semiconductor (CMOS) technology. Additionally or alternatively, the RF source 112 may be another type of source for millimeter waves.

The RF source 112 may be configured to emit a millimeter wave signal that includes millimeter wave radiation. In an example embodiment, the RF source 112 may include a narrow-band millimeter wave source configured to emit at a frequency of around 60 GHz. However, other emission frequencies (e.g., 50-100 GHz) are possible.

Although embodiments described herein include a single RF source 112, embodiments involving a plurality of RF sources are also contemplated.

The head-mountable device 120 includes a plurality of rectenna devices, which may be arranged in a rectenna array 122. Each rectenna device of the rectenna array 122 is operable to convert millimeter wave radiation emitted by the RF source 112 into a direct current (DC) electrical signal. In an example embodiment, the rectenna devices may include a circularly-polarized configuration. That is, the rectenna devices may be configured to rectify linearly polarized signals. In other embodiments, the rectenna devices may be configured to rectify a signal having a specific polarization. The head-mountable device 120 may be incorporated into an adhesive patch. The adhesive patch may be worn on a user's head, proximate to the RF source 112.

The head-mountable device 120 also includes a memory 126 and at least one processor 124. The processor 124 may execute instructions stored in the memory so as to carry out operations described herein. For example, the operations may include periodically sampling the DC electrical signals from the rectenna array 122. That is, the processor 124 may receive, from each rectenna device of the rectenna array 122, information indicative of the respective DC electrical signals. The operations may also include storing, in the memory 126, information indicative of the respective DC electrical signals.

In some embodiments, the operations also include determining, based on the respective DC electrical signals, a relative position between the helmet-mountable device 110 and the head-mountable device 120. Furthermore, in such a scenario, the operations may include storing, in the memory 126, information indicative of the relative position.

Optionally, the operations may include determining, based on the respective DC electrical signals, a head position with respect to the helmet-mountable device 110. That is, an analysis of the DC electrical signals may indicate a particular head position, which may include a head angle (yaw, pitch, roll, etc.). Furthermore, the DC electrical signals may indicate a rate of change of head position (e.g., a velocity vector). The head position and rate of change of head position may be stored in memory 126.

In an example embodiment, determining the relative position may include determining a three-dimensional displacement between the head-mountable device 120 and the helmet-mountable device 110 based on amplitudes of the respective DC electrical signals and spatial positions of the rectenna devices in the rectenna array 122. That is, a data set of the DC electrical signals may include the respective signal amplitudes for each rectenna device of the rectenna array 122. In some embodiments, the rectenna element nearest to the helmet-mountable device 110 may provide the largest amplitude DC electrical signal from the rectenna array 122. In an example embodiment, the rectenna array 122 may be laid out along an x-y plane (e.g., each rectenna may be arranged at a position including an x-coordinate and a y-coordinate. By tracking a spatial position of the largest amplitude signal among the different rectenna elements, a relative position of the helmet-mountable device 110 may be determined in the x-y plane. The amplitude may provide information about distance (e.g., along the z-axis) between the helmet-mountable device 110 and the head-mountable device 120.

In some embodiments, the DC electrical signals may be assigned a discrete value selected from a set of discrete values. Assigning the set of discrete values may include using a look up table to associate a discrete value with a given calibrated range of DC electrical signals.

The head-mountable device 120 also includes a battery 128. The battery 128 may include a primary (non-rechargeable) or a secondary (rechargeable) battery. The battery 128 may be a thin film battery, which may be operable to power the head-mountable device 120 for four hours or longer. Furthermore, in an example embodiment, battery 128 may include an alkaline battery, a nickel-metal-hydride battery or a lithium-ion battery. Other types of batteries are possible.

In some examples, the head-mountable device 120 includes a communication interface 130. The communication interface 130 may be operated by the processor 124 to transmit the information indicative of the relative position to an external device 140. In general, the head-mountable device 120 may use communication interface 130 to communicate with the external device 140 so as to transmit and/or receive various items of information. As an example, the head-mountable device 120 may transmit information about the relative position between the head-mountable device 120 and the helmet-mounted device 110.

The external device 140 may include a cloud server network, a mobile device, a laptop computer, a desktop computer, or a tablet computer. Other types of external devices 140 are possible and contemplated.

The communication interface 130 may be operable to establish a communication link with the external device 140 via one or more communication protocols. For example, the communication interface 130 may be configured to communicate with the external device 140 via a BLUETOOTH LOW-ENERGY (BLE), ZIGBEE, and/or Wi-Fi communication protocol. Additionally or alternatively, the communication interface 130 may be configured to establish the communication link with the external device 140 via near-field communication (NFC) and/or radio-frequency identification (RFID). Other types of communication protocols are possible and contemplated herein.

The communication interface 130 may include hardware and/or software configured to enable wireless communication between the external device 140 and/or other devices. For example, the communication interface 130 may enable messaging and/or data transfers between the head-mountable device 120, the external device 140, and/or a cloud-computing server.

Figure 2A:
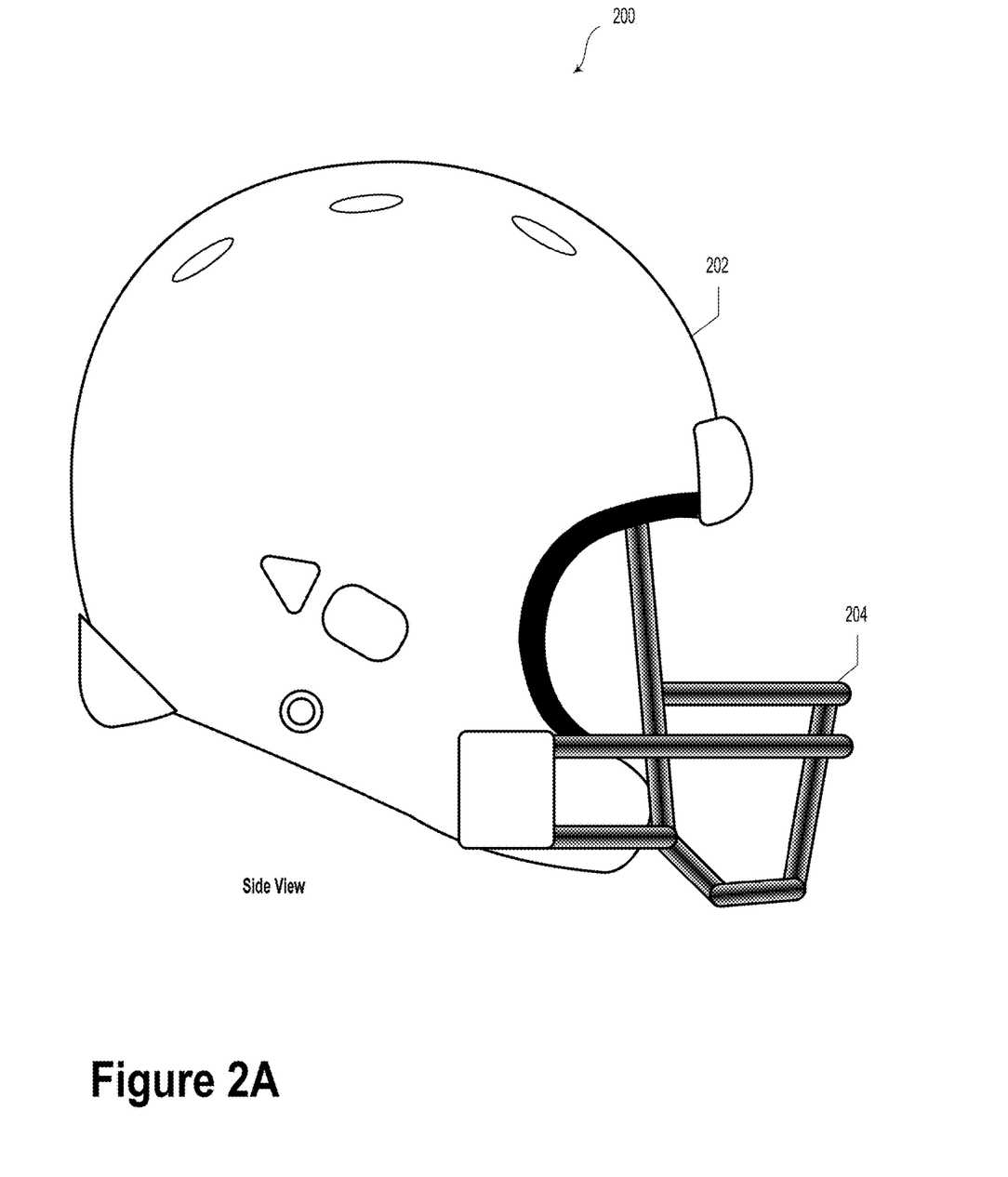
FIG. 2A illustrates a helmet according to an example embodiment.

FIG. 2A illustrates a helmet 200 according to an example embodiment. The helmet 200 may be a football helmet or another type of protective headgear designed to help protect a wearer from head injury. In an example embodiment, the helmet 200 may include a polycarbonate shell 202 configured to deflect an impact force. The helmet 200 may additionally or alternatively include padding configured to absorb at least a portion of the impact force. The helmet 200 may further include a facemask 204, which may protect a wearer's face.

Figure 2B:
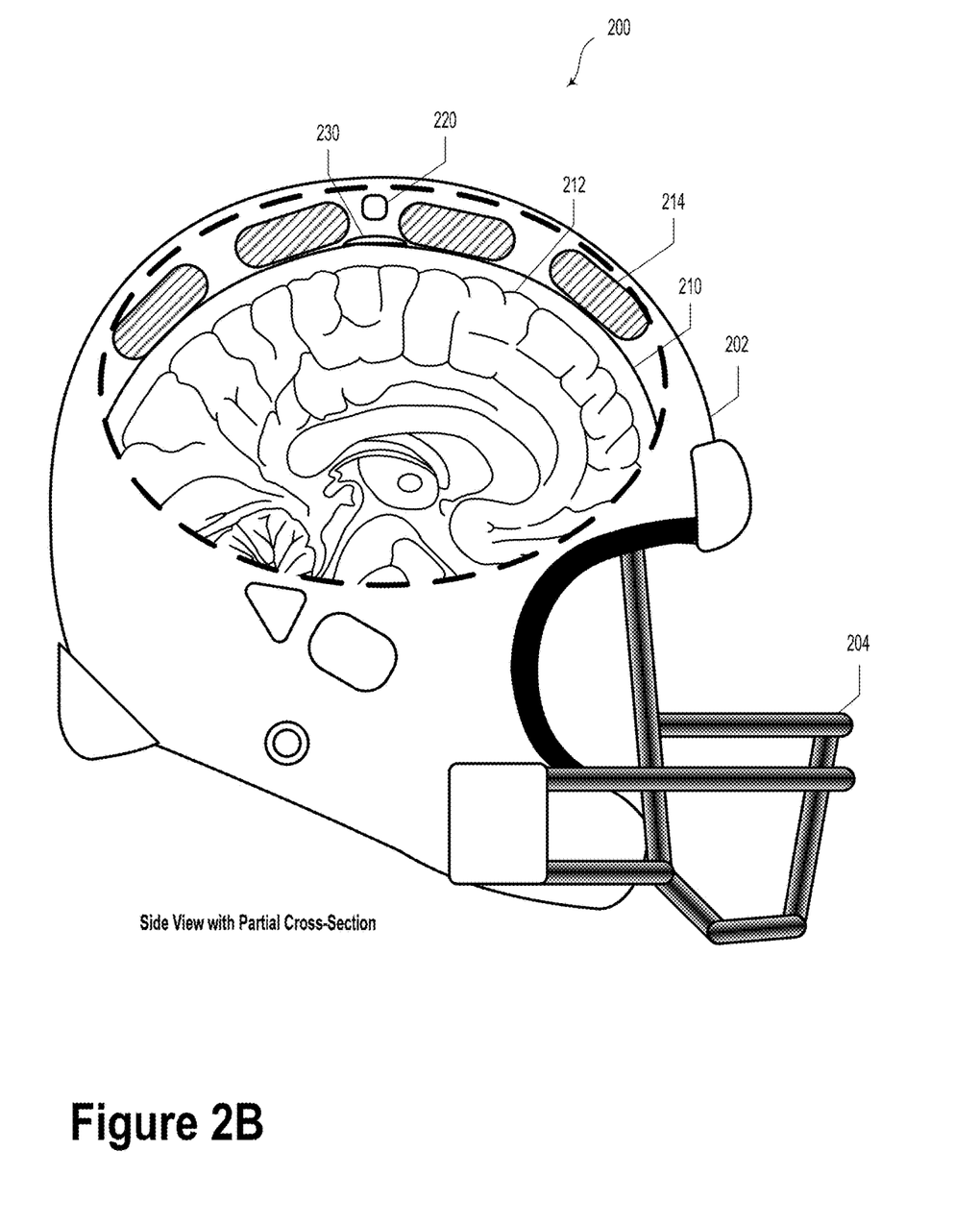
FIG. 2B illustrates a helmet with a partial cross-section view according to an example embodiment.

FIG. 2B illustrates a helmet 200 with a partial cross-section view, according to an example embodiment. As illustrated, the helmet 200 may be worn by a wearer. The wearer's head 210 may be cushioned by several pads 214 configured to cushion the force of an impact (e.g., to reduce the chance of injury to the wearer's brain 212). In an example embodiment, a helmet-mountable device 220 may be attached to the polycarbonate shell 202 or another part of the helmet. The helmet-mountable device 220 may be similar or identical to the helmet-mountable device 300 as illustrated and described below in reference to FIG. 3.

In an example embodiment, a head-mountable device 230 may be attached to the wearer's head 210. For example, the head-mountable device 230 may be incorporated into an adhesive patch. The adhesive patch may be adhered to the wearer's scalp (e.g., top of head, forehead, etc.). The head-mountable device 210 may be similar or identical to head-mountable device 400 as illustrated and described below in relation to FIG. 4.

As illustrated in FIG. 2B, the helmet-mountable device 220 may be positioned near the head-mountable device 230. In an example embodiment, the head-mountable device 230 may arranged so the helmet-mountable device 220 is centered above the head-mountable device. For example, the head-mountable device 230 may normally be approximately 5 mm away from the helmet-mountable device 220.

Figure 3:
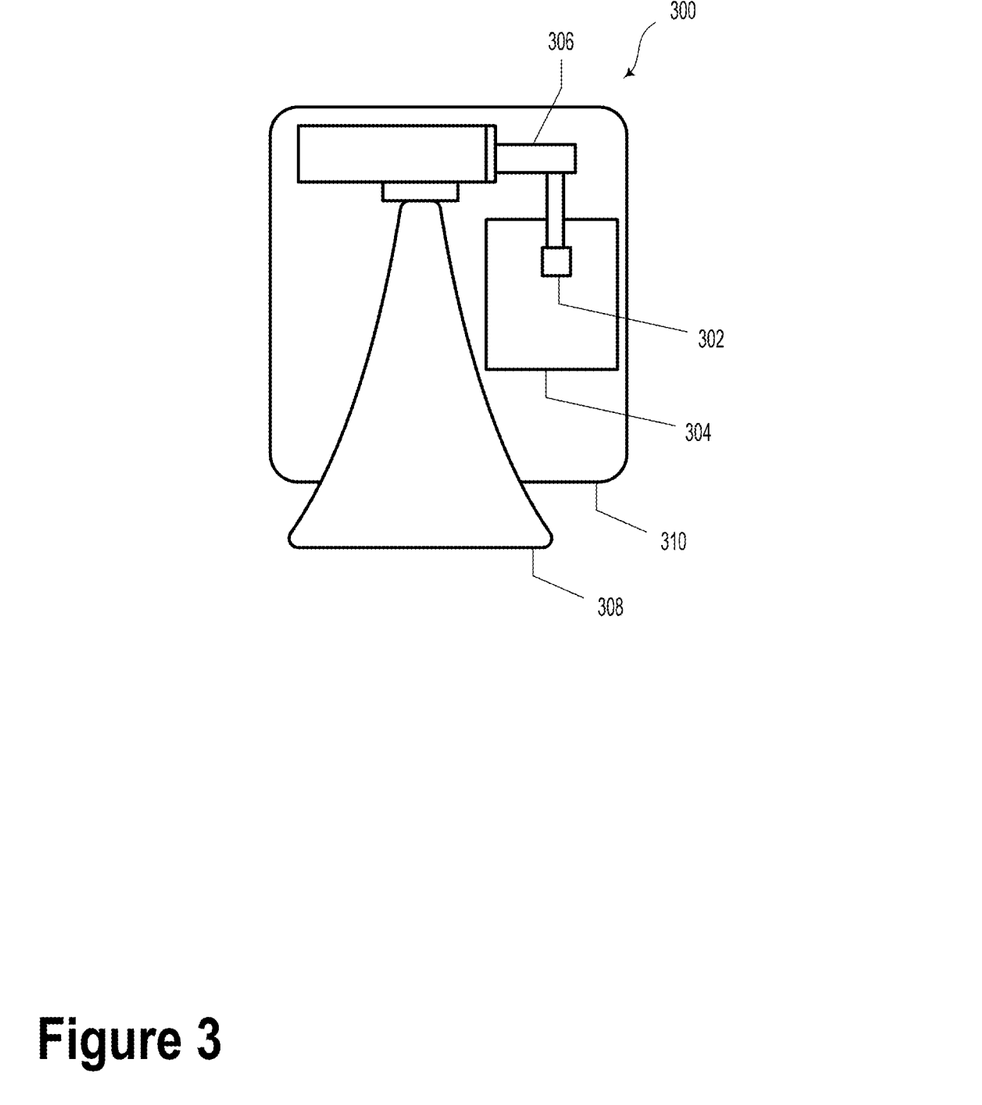
FIG. 3 illustrates a helmet-mountable device according to an example embodiment.

FIG. 3 illustrates a helmet-mountable device 300 according to an example embodiment. The helmet-mountable device 300 includes an RF source 302, which may include a microstrip resonator. The RF source 302 may be arranged along a printed circuit board 304. The RF source 302 may emit a millimeter wave signal along a waveguide 306. In some embodiments, the waveguide 306 may be a coaxial cable.

In an example embodiment, the RF source 302 may be operable to emit a 60 GHz RF signal. The waveguide 306 may be attached to a horn antenna 308. The helmet-mountable device 300 may incorporated into a package 310. The package 310 may be coupled to a helmet, similar or identical to helmet 200, as illustrated and described in reference to FIG. 2A. In an example embodiment, the package 310 may be coupled to the helmet via hook-and-loop connector, an adhesive substance, or via rivets, screws, or other fasteners.

Figure 4:
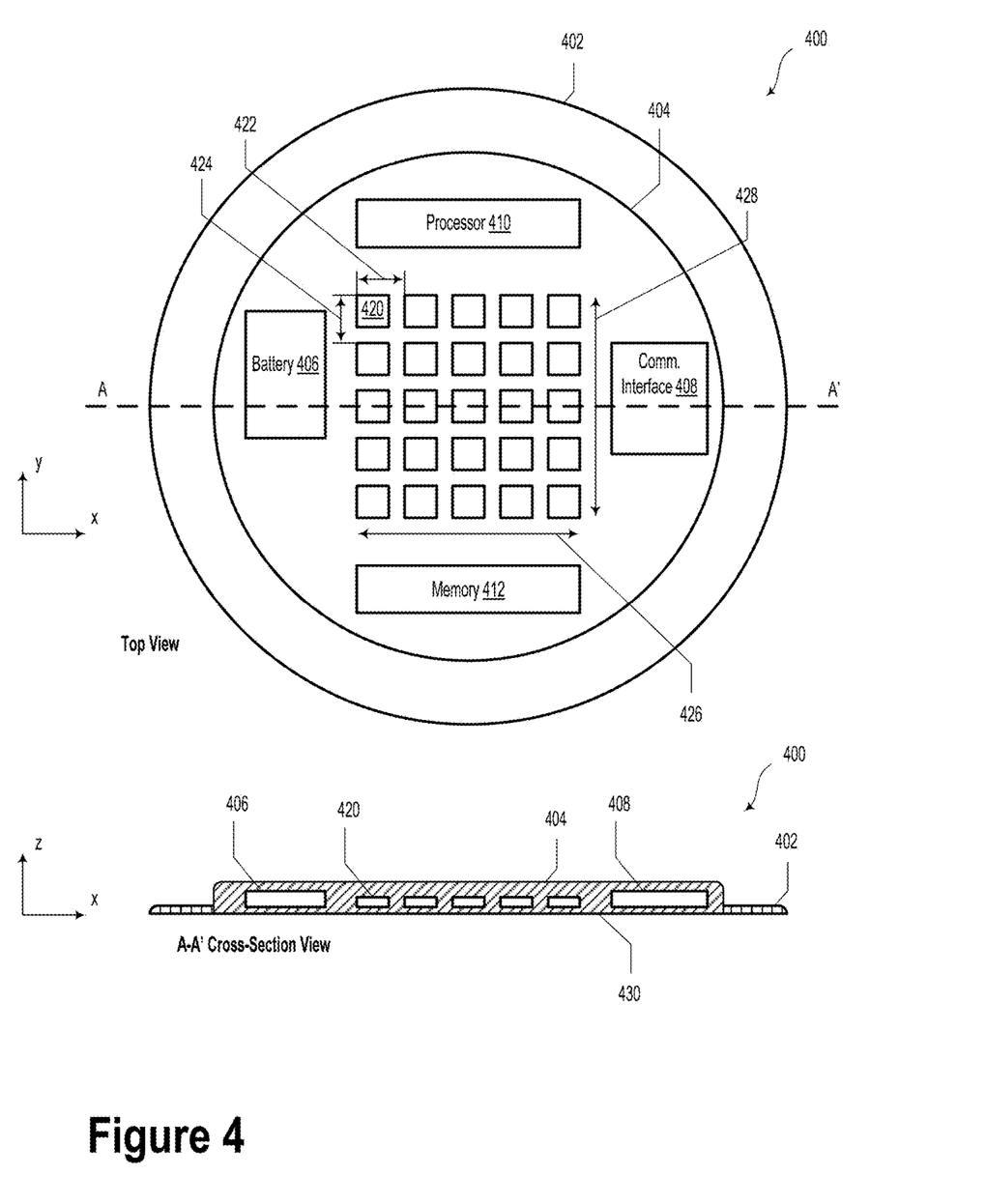
FIG. 4 illustrates a head-mountable device according to an example embodiment.

FIG. 4 illustrates a head-mountable device 400 according to an example embodiment. The head-mountable device 400 may include a battery 406, a communication interface 408, a processor 410, and a memory 412. These and other elements of head-mountable device 400 may be similar or identical to corresponding elements of the head-mountable device 120 as illustrated and described in reference to FIG. 1. For example, processor 410 may be configured to carry out program instructions stored in memory 412. In such a scenario, processor 410 may include one or more microprocessors. Processor 410 may include a multi-core processor and may provide multi-threading operation. Additionally or alternatively, the processor 410 may include an application-specific integrated circuit (ASIC) and/or a field programmable gate array (FPGA).

The memory 412 may include a volatile or non-volatile semiconductor memory. For example, memory 412 may include a random-access memory (RAM), a read-only memory (ROM), a programmable ROM (PROM), a dynamic RAM (DRAM), or static RAM (SRAM). Additionally or alternatively, memory 412 may include a storage device, such as a solid state drive (SSD) or hard disk drive.

The head-mountable device 400 may be configured and/or implemented as an adhesive patch. The adhesive patch may be mounted via adhesive to a skin surface of a person. Namely, the head-mountable device 400 may be mounted on a head, particularly a scalp of a person. In an example embodiment, the head-mountable device 400 may be mounted near the helmet-mountable device 300 when a corresponding helmet is worn. The head-mountable device 400 may include a housing and/or an encapsulation that is biocompatible and/or hypoallergenic. For example, the housing of the head-mountable device 400 may include one or more of parylene, polyimide, polyethylene, polycarbonate, or polymethylmethacrylate (PMMA). Other materials are possible.

In some embodiments, the head-mountable device 400 may include a main body portion 404 and an adhesive portion 402. For example, the main body portion 404 may house and/or encapsulate the electronic and/or mechanical elements of the head-mountable device 400. Furthermore, the adhesive portion 402 may include woven fabric, plastic or latex. The adhesive portion 402 may include at least one surface coated with an adhesive material. The adhesive portion 402 may be operable to keep the skin area 430 under the main body portion 404 free from dirt, dust, abrasion, etc. Before mounting to the body, the adhesive portion 402 may be coupled to a disposable backing material, similar to an adhesive bandage. Additionally or alternatively, the head-mountable device 400 may be adhered to the skin surface of the living body via a skin bonding material such as a cyanoacrylate or a liquid bandage.

Although FIG. 4 illustrates the head-mountable device 400 as formed in a circular shape, other shapes are possible and contemplated. In an example embodiment, the head-mountable device 400 may be attached to a head of a wearer with tape, a strap, an elastic headband, or another type of conformal head covering (e.g., a balaclava, bandanna, skull cap, etc.).

The battery 406 may include a primary (non-rechargeable) or a secondary (rechargeable) battery. The battery 406 may be configured to be recharged wirelessly. In other example embodiments, the battery 406 and the other elements of the head-mountable device 400 may represent a single-use, disposable patch.

The head-mountable device 400 may include a plurality of rectenna devices 420. The plurality of rectenna devices may be arranged in a two-dimensional array. As illustrated in FIG. 4, the two-dimensional array may include a 5×5 array of single rectenna devices. However, other array sizes are possible. For example, the array may include 20×50 rectenna devices or 100×100 rectenna devices. Furthermore, while FIG. 4 illustrates a two-dimensional array of rectenna devices, other arrangements, such as aperiodic or random arrangements, are possible and contemplated.

In an example embodiment, the two-dimensional array may include a rectenna device arranged periodically in the x-direction (e.g., according to x-period 422) and a rectenna device arranged periodically in the y-direction (e.g., according to y-period 424). The two-dimensional array may have an extent of x-extent 426 by y-extent 428.

In an example embodiment, the x-period 422 and y-period 424 may be the same or different in their respective direction. As a non-limiting example of possibilities, the x-period 422 and y-period 424 may be 1 millimeter. However, other periods in the x and y-directions are possible (e.g., 0.5 millimeters, 2 millimeters, 10 millimeters, etc.). In an example embodiment, the x-extent 426 and y-extent 428 may be 10 millimeters by 10 millimeters. Alternatively, the x-extent 426 and the y-extent 428 may include different dimensions, such as 5×20 millimeters or 25×25 millimeters. It is understood that an array of single rectennas may include a wide variety of different arrangements, periodicities, and extents, all of which are contemplated herein.

Figure 5:
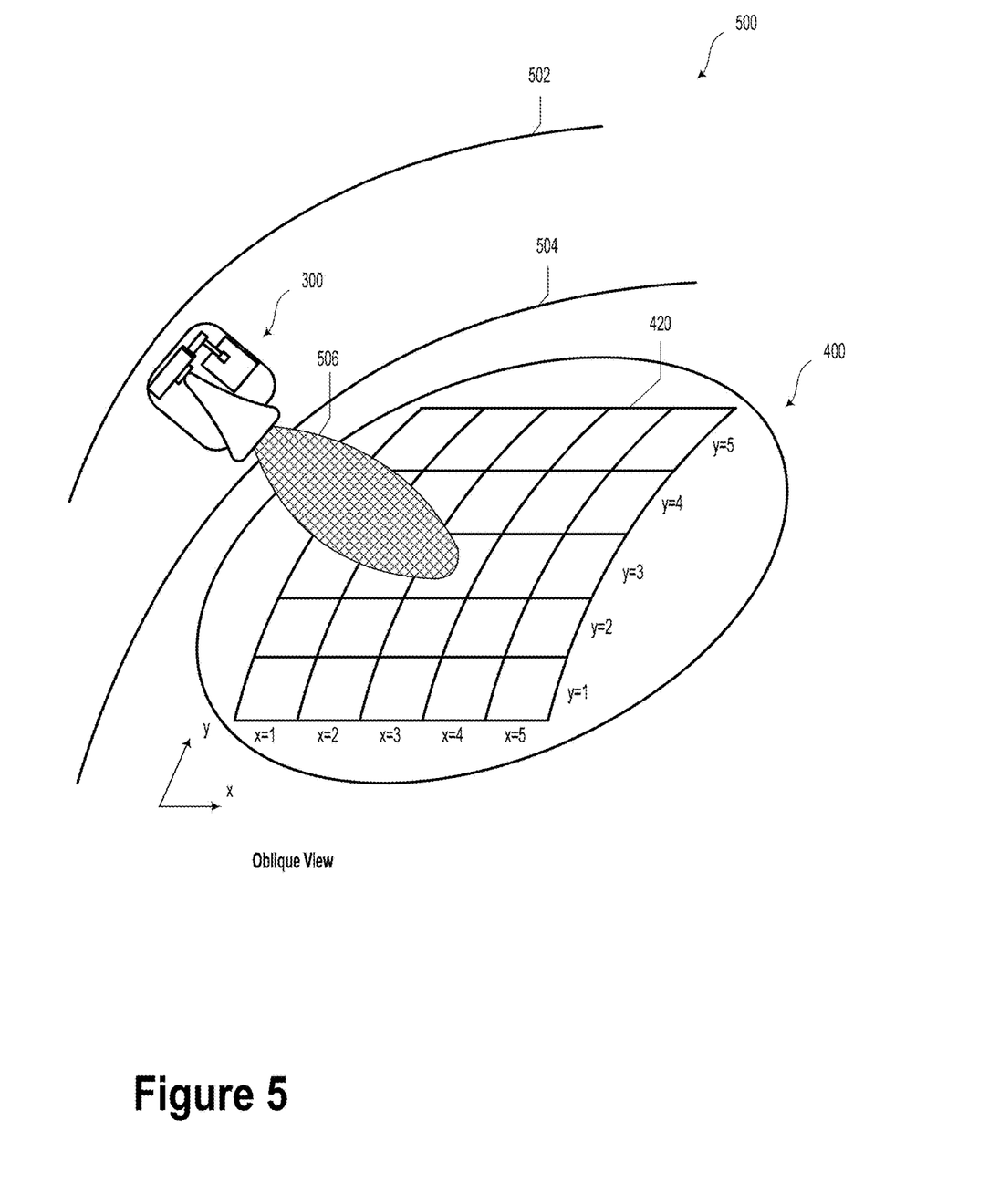
FIG. 5 illustrates a scenario including a helmet-mountable device and a head-mountable device according to an example embodiment.

FIG. 5 illustrates a scenario 500 including a helmet-mountable device 300 and a head-mountable device 400 according to an example embodiment. Namely, the helmet-mountable device 300 may be coupled to a helmet 502. The helmet 502 may be similar or identical to helmet 200 as illustrated and described in reference to FIG. 2A. Alternatively, helmet 502 may be another type of protective helmet or head gear.

The head-mountable device 400 may be adhered, affixed or otherwise coupled to a head 504 of a wearer of the helmet 502. In an example embodiment, the helmet-mountable device 300 may emit an RF signal 506 that may be received by one or more rectenna devices of the plurality of rectenna devices 420. In such a scenario, the plurality of rectenna devices 420 may convert power from a received RF signal 506 into respective DC electrical signals. The respective DC electrical signals may be sampled by a processor of head-mountable device 400.

FIGS. 6A through 6D illustrate sets of DC electrical signals from the plurality of rectenna devices in various example scenarios. These signals may provide information about a relative location of the helmet-mountable device 300 and the head-mountable device 400 and/or a health status of the wearer of the helmet 502. The data points provided in FIGS. 6A through 6D may relate to respective rectenna devices 420 of the rectenna array as illustrated in FIG. 5. That is, the data points may be sampled from each of the rectenna devices of the rectenna array. The respective data visualizations provide another way to interpret the data points, both individually and collectively.

It is understood that the unitless data values corresponding to each data point in FIGS. 6A through 6D are for descriptive purposes only. The actual data value units may include a voltage, a current, a digital code, etc. Other ways to express respective DC electrical signals from the respective rectenna devices are contemplated herein. In an example embodiment, various DC electrical signal values may be discretized by processor 124. That is, DC electrical signal values may be assigned a digital code based on a received voltage or current signal amplitude. In some embodiments, the DC electrical signals may be assigned to a set of discrete digital codes that may include hundreds, thousands, millions, or more possible values.

The digital code assignment may be additionally or alternatively based on a calibration process. That is, a calibration may be used to determine a "normal" relative position between the head-mountable device 400 and the helmet-mountable device 300 (e.g., an "undisplaced" position while the wearer is not undergoing impact forces or other movements). In an example embodiment, the calibration may include determine the normal relative position based on an initial fitting position. Additionally or alternatively, the calibration process may periodically reset or adjust the normal relative position by using a time-weighted average of DC signals. In such a scenario, the highest average DC signal over the calibration period may correspond to a rectenna position in the x,y plane. Furthermore, an average highest DC signal may represent a normal z-position distance. As such, the x, y, and z coordinates for the normal relative position may be assigned a zero value and displacements away from the normal relative position may be quantified in negative or positive distance units along their respective axes.

Figure 6A:
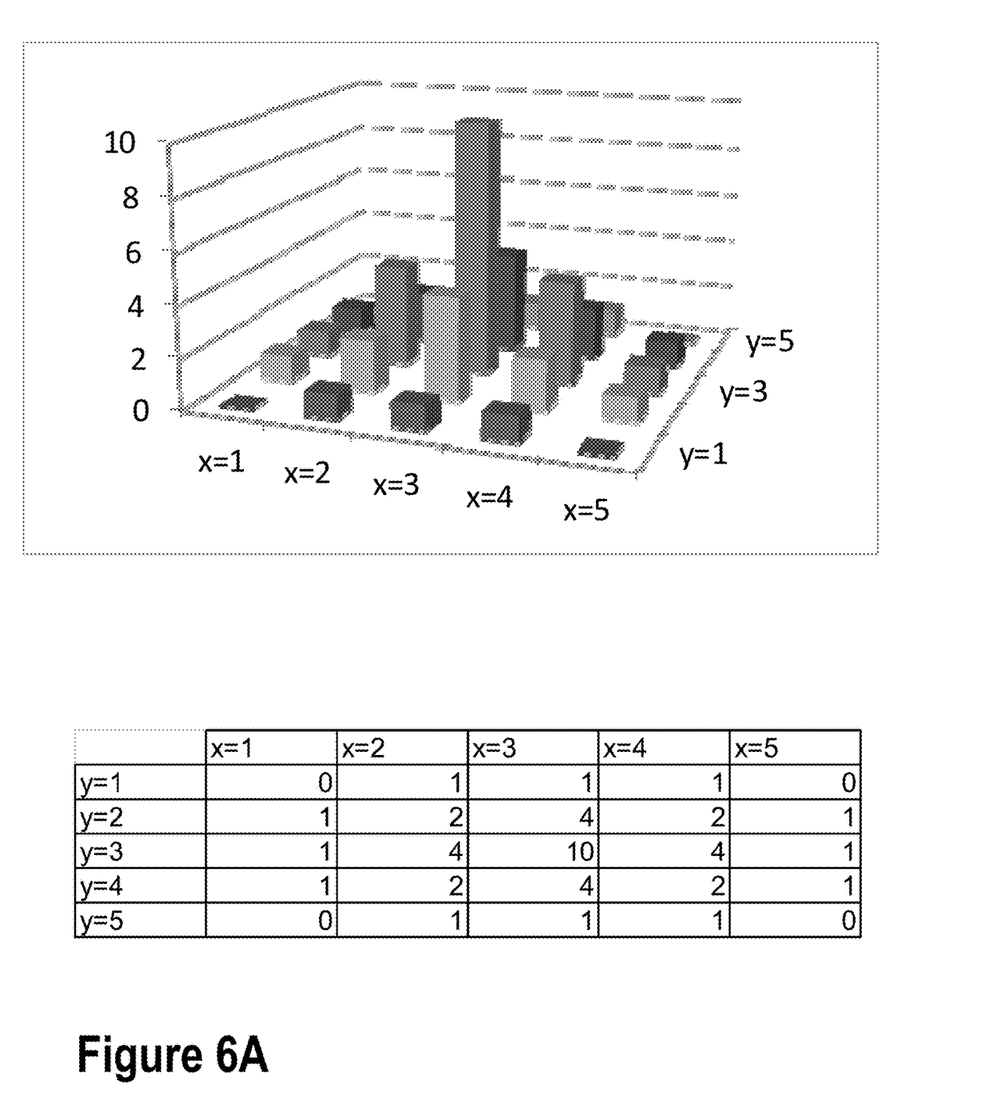
FIG. 6A illustrates raw and visualized data according to an example embodiment.

FIG. 6A illustrates raw and visualized data 600 according to an example embodiment. The raw data indicates a local maximum at rectenna (3,3) (the rectenna at location x=3, y=3). Collectively, the raw data may be similar to a point spread function or an impulse response and may be based on the beam spread of RF signal 506 as well as a distance between the head-mountable device 400 and the helmet-mounted device 300. Specifically, a local maximum value may be 10 for rectenna (3,3) and drop off along the rectenna array when moving away from rectenna (3,3). As such, the data may be interpreted to mean that the helmet-mountable device 300 is located most closely to rectenna (3,3). For the purposes of description, the data in FIG. 6A will be considered the normal relative position for the following scenarios. Again, for purposes of description, the normal relative position may be assigned the coordinate (0,0,0) in units of millimeters.

Figure 6B:
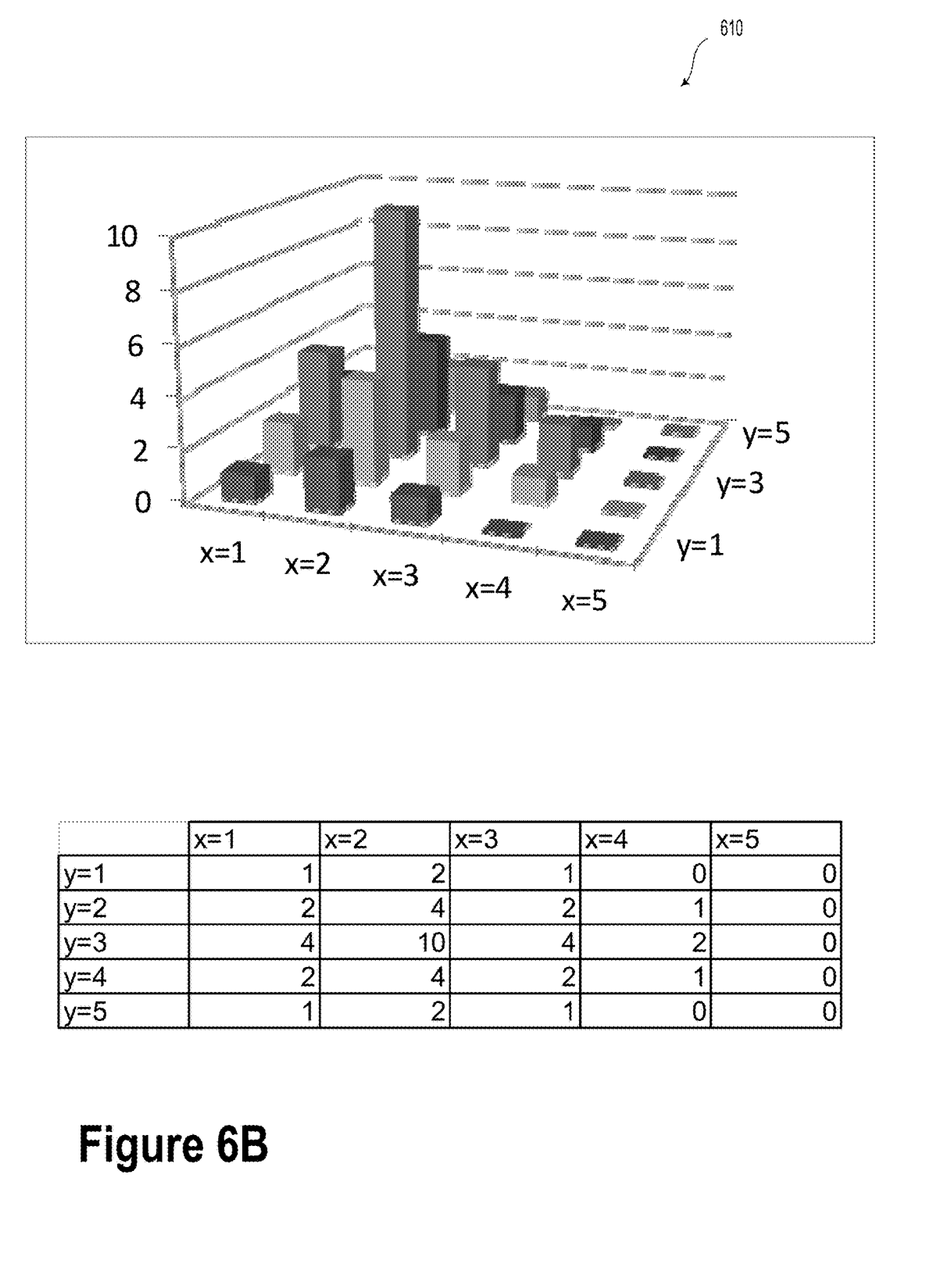
FIG. 6B illustrates raw and visualized data according to an example embodiment.

FIG. 6B illustrates raw and visualized data 610 according to an example embodiment. In such a scenario, the local maximum may be at rectenna (2,3). That is, compared to the normal relative position, the point spread function may move along the x-direction and may indicate that the helmet-mountable device 300 is located most closely to rectenna (2,3). Furthermore, the maximum local value (10) is the same as the normal relative position data 600. As such, the data 610 may be interpreted to show that the head of the wearer of the helmet has moved by −1 x-period with respect to the normal relative position. For example, for an x-period (rectenna period along the x-axis) of 2 millimeters, this data 610 may indicate that the head of a wearer of the helmet moved 2 millimeters along the x direction. In some embodiments, a movement vector may be assigned to such data. For example, the movement vector may be (−2,0,0) millimeters to indicate a relative movement equivalent to −2 millimeters along the x-axis.

Figure 6C:
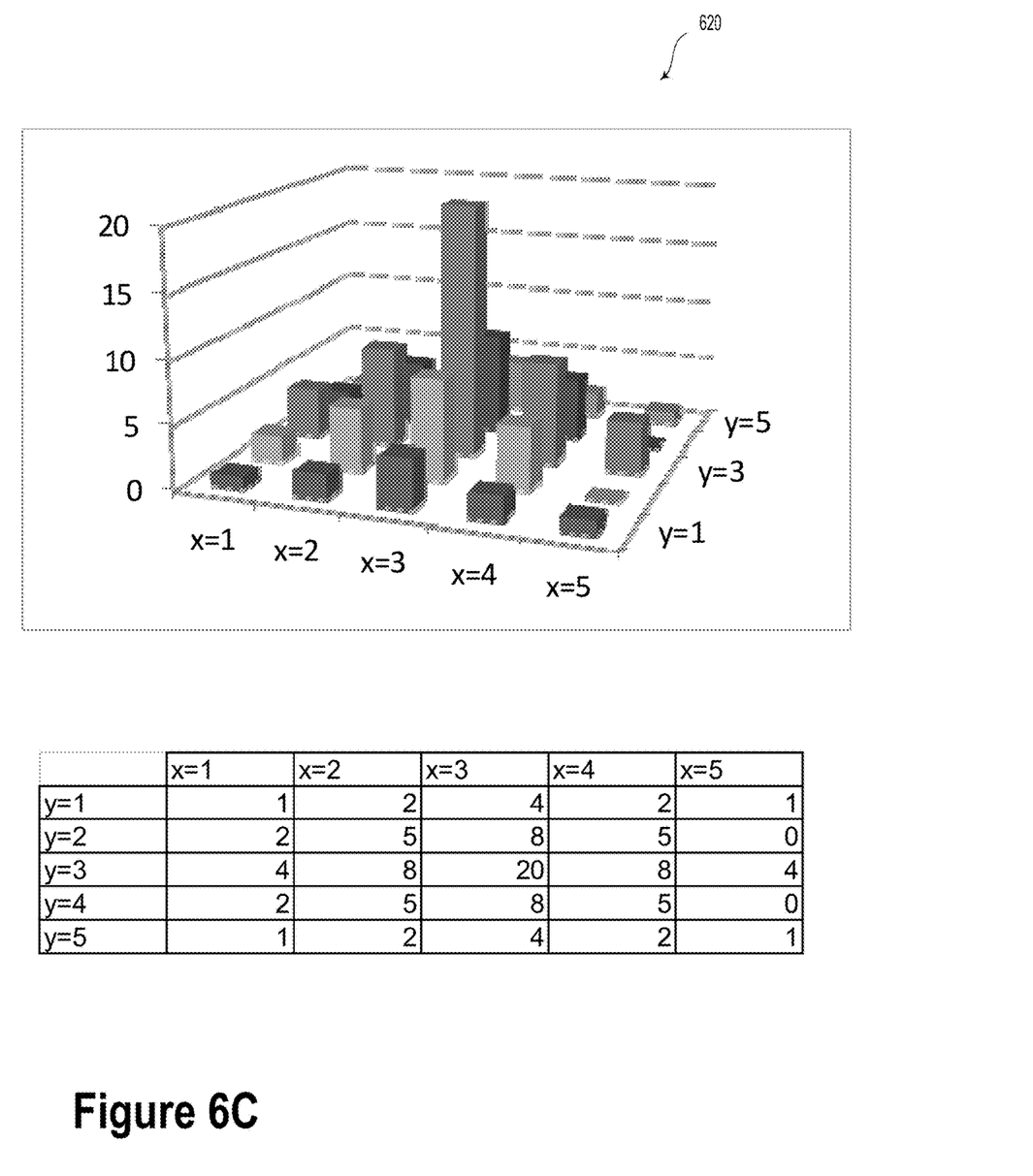
FIG. 6C illustrates raw and visualized data according to an example embodiment.

FIG. 6C illustrates raw and visualized data 620 according to an example embodiment. In such a scenario, the maximum local value is 20, which occurs at rectenna (3,3). In other words, the power received by rectenna (3,3) has increased, which may indicate that the rectenna (3,3) is closer to the RF source and the helmet-mountable device 300 than the normal relative position. In such a scenario, a look-up table or calibration data may be used to correlate the maximum local value (20) with a z-height value. For example, if the normal relative position includes a z-height of 10 millimeters, such an increase in the maximum local value may indicate a displacement of −3 millimeters along the z-axis (e.g., the head-mountable device and helmet-mountable device are closer to one another). In some embodiments, a movement vector may also be assigned to such data. For example, the movement vector in this case may be (0,0,−3), which may indicate a relative movement of −3 millimeters between the RF source and respective rectenna along the z-axis.

Figure 6D:
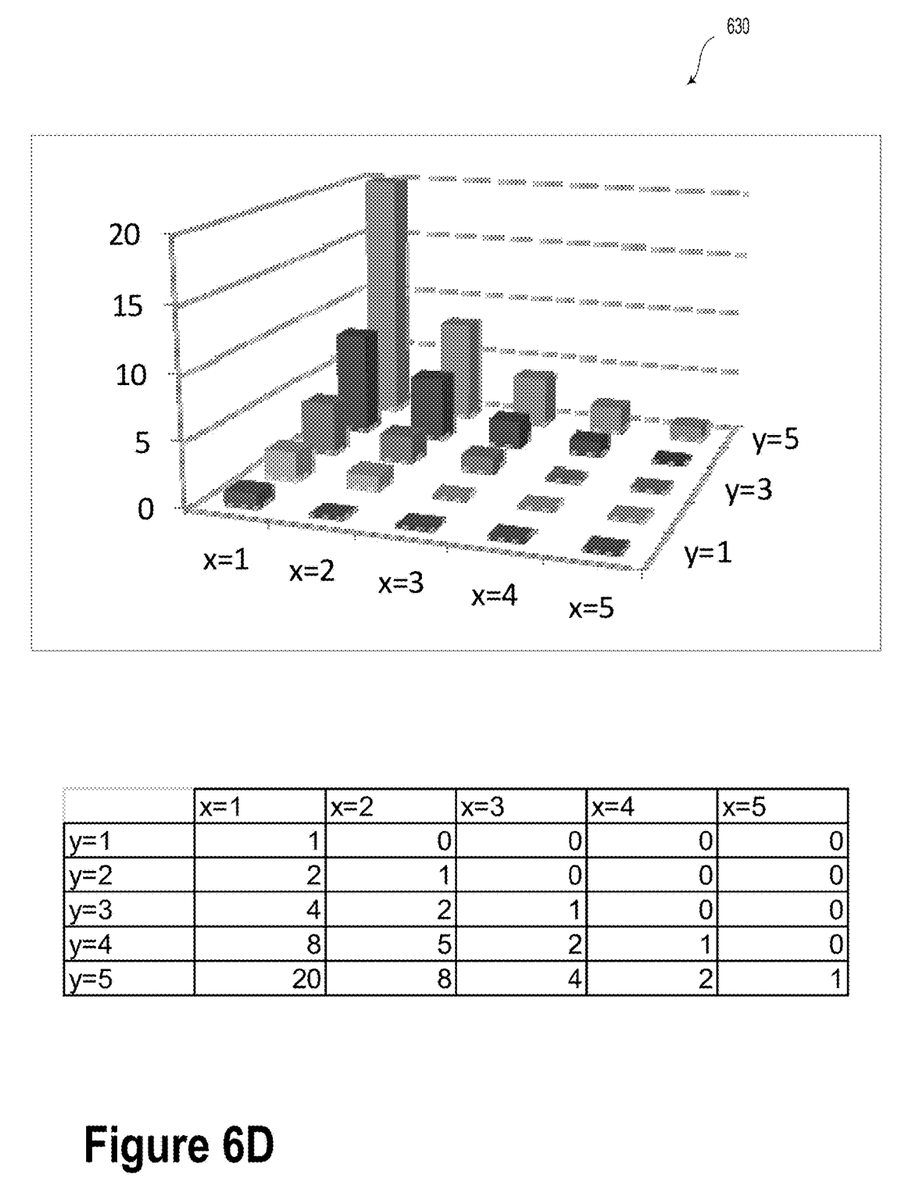
FIG. 6D illustrates raw and visualized data according to an example embodiment.

FIG. 6D illustrates raw and visualized data 630 according to an example embodiment. As illustrated, a local maximum value of 20 may be localized at rectenna (1,5). In such a scenario, the data may indicate that the head of a wearer of the helmet has moved −2 periods in x, +2 periods in y, and −3 millimeters along the z-axis. Again, under a scenario in which the rectenna array has an x-period and y-period both equal to 2 millimeters, the movement vector may be described as (−4,+4,−3) millimeters.

Sampling of rectenna data (e.g., of which data 600, 610, 620, and 630 are examples) may be performed on a periodic basis. For example, sampling of the DC signal from each rectenna device may occur every 2 microseconds (500 kHz), 10 microseconds (100 kHz), 100 microseconds (10 kHz), or some other sampling rate. In an example embodiment, a rate of change of location may be determined based on the three-dimensional location difference between two data samples divided by the time between data samples. Some of the indications and diagnoses described herein may be performed based on the rate of change of location.

During an athletic event, such as a football game, rectenna data may provide information indicative of the forces sustained by the head of the helmet-wearer. For example, by sampling at in the tens of kHz, a large amount of relative displacement data may be obtained during play. As such, players, coaches, and medical personnel may have access to data about potential head injury in real-time, at half time (perhaps when the data may be downloaded from the head-mountable device), or at any other time. In such a scenario, the system and methods herein may provide a large amount of data that may help to prevent serious injury as well as help diagnose concussions and other head trauma.

In some scenarios, a head position of a wearer of the helmet may be determined based on the received data. That is, operations may also include determining a head position based on the information indicative of the relative position between the RF source and the plurality of rectenna devices. For example, data 610 may indicate that the wearer is tilting his or her head and the slight shift along the x-axis may be a potential result. Head position determinations may be made when taking into account relatively slow changes (e.g., over tenths of a second) in the relative positions between the helmet and the head of a wearer of the helmet.

In some embodiments, twisting motions of the head with respect to the helmet may be monitored. For example, if the rectenna devices are configured to rectify an RF signal having a specific polarization, a relative rotational motion between the head and helmet would change the amplitude of the rectified DC signal.

In an example embodiment, data transfer between the head-mountable device and an external device may take place over a wired or wireless communication link (e.g., using communication interface 130 shown in FIG. 1 or communication interface 408 shown in FIG. 4). In some cases, the head-mountable device may be configured to provide real-time head/helmet-motion data to an external device. In a further embodiment, the head-mountable device or the external device may determine that the head/helmet-motion data has exceeded a predetermined motion threshold. In such a scenario, the external device may provide an alert notification. For example, during a football game, if a player sustains a significant blow to the head that may be indicative of a concussion, the external device may provide a notification to the coach, training staff, and/or emergency personnel.

In some embodiments, if the head/helmet-motion data exceeds a predetermined threshold, an indicator may be provided so as to alert coaches, staff, or the player. For example, a light-emitting diode (LED) may be illuminated on the player's helmet so as to alert others of a possible head injury. In some cases, as a safety precaution, a player may be removed from the field of play for medical examination based on the indication.

In some embodiments, data may be uploaded to a cloud server or another type of computer network. The cloud server may apply machine learning so as to better predict and diagnose head injuries based on aggregated data and their associated outcomes.

Systems described herein need not include a helmet and a head-mountable device. For example, embodiments may include applications in which a relative position between two objects is monitored over time. For instance, applications may include seismic monitoring, bridge structure safety monitoring, tamper protection, non-contact distance measurement, among others. In such scenarios, an example system may include a more generalized embodiment of system 100 as illustrated and described in reference to FIG. 1. Namely, the system may be configured to monitor a relative position between the RF source and the plurality of rectenna devices in any of the above applications.

The system may include a radio frequency (RF) source of a millimeter wave signal comprising millimeter wave radiation. The system may also include a plurality of rectenna devices, which may be arranged in a rectenna array. Each rectenna device of the plurality of rectenna devices may be configured to convert millimeter wave radiation emitted by the RF source into a direct current (DC) electrical signal.

As such, a processor of the system may execute instructions stored in a memory so as to carry out operations. The operations may include receiving, from each rectenna device of the plurality of rectenna devices, a respective DC electrical signal. The respective DC electrical signals may be based on a relative location of the RF source and the respective rectenna device of the rectenna array. The operations include storing, in the memory, information indicative of the respective DC electrical signals.

The operations include determining, based on the respective DC electrical signals, a relative position between the RF source and the plurality of rectenna devices. The information indicative of the relative position may be stored in the memory.

In an example embodiment, determining the relative position may include determining a three-dimensional displacement between the RF source and the plurality of rectenna devices based on amplitudes of the respective DC electrical signals and spatial positions of the rectenna devices in the plurality of rectenna devices.

As a non-limiting example, an RF source may be coupled to a first tectonic plate and the plurality of rectenna devices may be coupled to a second tectonic plate. As such, the system may be configured to determine changes in the relative position between the devices over time. Such a system may provide high quality and high temporal resolution information about earthquakes or fault slippage.

In another example, an RF source may be coupled in a first position along a steel beam and the plurality of rectenna devices may be coupled to a second position along the steel beam. As such, the system may be configured to detect a sag or fatigue of the steel beam. Such a system may provide high quality and high temporal resolution information about bridge fatigue or other structural loading/safety considerations. A variety of other applications are contemplated herein.

Method Examples

Figure 7:
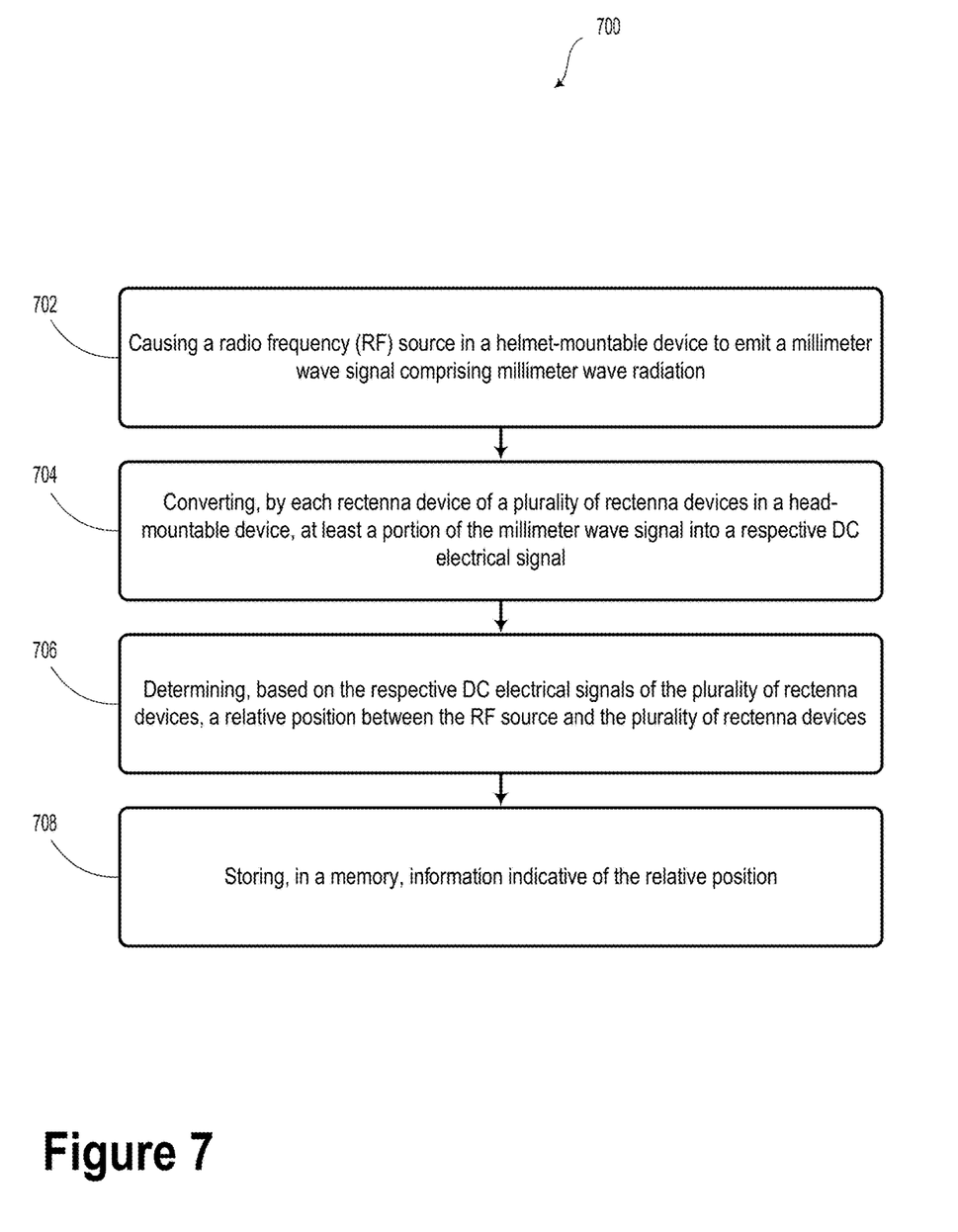
FIG. 7 is a flowchart illustrating a method according to an example embodiment.

FIG. 7 illustrates a method 700, according to an embodiment. The method 700 includes blocks that may be carried out in any order. Furthermore, various blocks may be added to or subtracted from method 700 within the intended scope of this disclosure. The method 700 may correspond to steps that may be carried out using any or all of the devices and/or systems illustrated and described in reference to FIGS. 1, 2A, 2B, 3, 4, and 5.

Block 702 includes causing a radio frequency (RF) source in a helmet-mountable device to emit a millimeter wave signal that includes millimeter wave radiation. In an example embodiment, the RF source may be operable to provide a 60 GHz RF signal.

Block 704 includes converting, by each rectenna device of a plurality of rectenna devices in a head-mountable device, at least a portion of the millimeter wave signal into a respective DC electrical signal.

Block 706 includes determining, based on the respective DC electrical signals of the plurality of rectenna devices, a relative position between the RF source and the plurality of rectenna devices.

Block 708 includes storing, in a memory, information indicative of the relative position.

Optionally, the method may include determining, based on the respective DC electrical signals, a head position with respect to the helmet-mountable device. In such a scenario, the method may include storing, in the memory, information indicative of the head position.

The method further includes assigning a discrete value selected from a set of discrete values to the respective DC electrical signals. For example, the set of discrete values may include a look up table based on a calibrated range of DC electrical signals.

In an example embodiment, determining the relative position may include determining a three-dimensional displacement between the RF source and the plurality of rectenna devices based on amplitudes of the respective DC electrical signals and spatial positions of the rectenna devices in the plurality of rectenna devices.

The method may include retrieving the information indicative of the relative position from the memory. In such a scenario, the method may further include transmitting, via a communication interface, the retrieved information indicative of the relative position to an external device.

In an example embodiment, the plurality of rectenna devices may be incorporated into an adhesive patch. Furthermore, the method may include applying the adhesive patch to a surface of a human head.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
    a helmet-mountable device comprising:
        a radio frequency (RF) source of a millimeter wave signal comprising millimeter wave radiation; and
    a head-mountable device comprising:
        a plurality of rectenna devices, wherein each rectenna device of the plurality of rectenna devices converts millimeter wave radiation emitted by the RF source into a direct current (DC) electrical signal;
        a memory; and at least one processor, wherein the at least one processor executes instructions stored in the memory so as to carry out operations, the operations comprising:
receiving, from each rectenna device of the plurality of rectenna devices, a respective DC electrical signal; and
storing, in the memory, information indicative of the respective DC electrical signals.

2. The system of claim 1, wherein the operations further comprise:
determining, based on the respective DC electrical signals, a relative position between the helmet-mountable device and the head-mountable device; and
storing, in the memory, information indicative of the relative position.

3. The system of claim 1, wherein the operations further comprise:
determining, based on the respective DC electrical signals, a head position with respect to the helmet-mountable device; and
storing, in the memory, information indicative of the head position.

4. The system of claim 2, wherein determining the relative position comprises determining a three-dimensional displacement between the head-mountable device and the helmet-mounted device based on amplitudes of the respective DC electrical signals and spatial positions of the rectenna devices in the plurality of rectenna devices.

5. The system of claim 2, wherein the head-mountable device further comprises a communication interface.

6. The system of claim 5, wherein the operations further comprise transmitting, via the communication interface, the information indicative of the relative position to an external device.

7. The system of claim 1, wherein the operations further comprise:
assigning a discrete value selected from a set of discrete values to the respective DC electrical signals, wherein the set of discrete values comprises a look up table based on a calibrated range of DC electrical signals.

8. The system of claim 1, wherein the head-mountable device is incorporated into an adhesive patch.

9. The system of claim 1, wherein the millimeter wave signal comprises a 60 GHz millimeter wave signal.

10. A method comprising:
causing a radio frequency (RF) source in a helmet-mountable device to emit a millimeter wave signal comprising millimeter wave radiation;
converting, by each rectenna device of a plurality of rectenna devices in a head-mountable device, at least a portion of the millimeter wave signal into a respective DC electrical signal;
determining, based on the respective DC electrical signals of the plurality of rectenna devices, a relative position between the RF source and the plurality of rectenna devices; and
storing, in a memory, information indicative of the relative position.

11. The method of claim 10, wherein the operations further comprise:
determining, based on the respective DC electrical signals, a head position with respect to the helmet-mountable device; and
storing, in the memory, information indicative of the head position.

12. The method of claim 10, wherein determining the relative position comprises determining a three-dimensional displacement between the RF source and the plurality of rectenna devices based on amplitudes of the respective DC electrical signals and spatial positions of the rectenna devices in the plurality of rectenna devices.

13. The method of claim 10, further comprising retrieving the information indicative of the relative position from the memory.

14. The method of claim 13, further comprising transmitting, via a communication interface, the retrieved information indicative of the relative position to an external device.

15. The method of claim 10, further comprising assigning a discrete value selected from a set of discrete values to the respective DC electrical signals, wherein the set of discrete values comprises a look up table based on a calibrated range of DC electrical signals.

16. The method of claim 10, wherein the plurality of rectenna devices is incorporated into an adhesive patch, further comprising applying the adhesive patch to a surface of a human head.

17. The method of claim 10, wherein the millimeter wave signal comprises a 60 GHz millimeter wave signal.

18. A system comprising:
a radio frequency (RF) source of a millimeter wave signal comprising millimeter wave radiation;
a plurality of rectenna devices, wherein each rectenna device of the plurality of rectenna devices converts millimeter wave radiation emitted by the RF source into a direct current (DC) electrical signal;
a memory; and
at least one processor, wherein the at least one processor executes instructions stored in the memory so as to carry out operations, the operations comprising:
receiving, from each rectenna device of the plurality of rectenna devices, a respective DC electrical signal;
storing, in the memory, information indicative of the respective DC electrical signals;
determining, based on the respective DC electrical signals, a relative position between the RF source and the plurality of rectenna devices; and
storing, in the memory, information indicative of the relative position.

19. The system of claim 18, wherein determining the relative position comprises determining a three-dimensional displacement between the RF source and the plurality of rectenna devices based on amplitudes of the respective DC electrical signals and spatial positions of the rectenna devices in the plurality of rectenna devices.

20. The system of claim 18, wherein the operations further comprise:
determining a head position based on the information indicative of the relative position.

* * * * *